July 28, 1970  T. J. MOTTER  3,522,143
PHOTOTROPIC UNITS

Filed Aug. 18, 1966  2 Sheets-Sheet 1

INVENTOR.
Theodore J. Motter
BY
Nobbe & Collins
ATTORNEYS

INVENTOR.
Theodore J. Motter
BY
Nobbe & Collins.
ATTORNEYS

United States Patent Office 3,522,143
Patented July 28, 1970

3,522,143
PHOTOTROPIC UNITS
Theodore J. Motter, near Genoa, Ohio, assignor to Libbey-Owens-Ford Company, Toledo, Ohio, a corporation of Ohio
Filed Aug. 18, 1966, Ser. No. 573,247
Int. Cl. B32b 17/10; G02b 5/22
U.S. Cl. 161—199                                17 Claims

ABSTRACT OF THE DISCLOSURE

This invention relates to a phototropic unit comprising a body of plastic, a metal dithizonate rendering said body phototropic and optionally at least one member of the group consisting of a sheet of glass, an ultra violet filter, a transparent light reflecting film and a yellow dye.

---

The present invention relates broadly to phototropic bodies and more particularly to a body of this character that is suitable for use as a lamina or interlayer in a laminated safety glass unit.

Laminated safety glass is probably best known for its use in the automotive field and for that purpose is generally made up of two sheets of glass with an interposed layer of plastic all bonded together under heat and pressure into a unitary structure.

However, in aircraft glazings for example, a considerable number of glass sheets may be combined with a corresponding number of plastic interlayers while, for other uses, single plastic sheets, laminations of plastic sheets only and simple glass to plastic laminations may be used.

According to this invention there is provided first, a phototropic body or sheet that can be satisfactorily employed in connection with any of the above and, second, an improved form of laminated safety glass unit having remarkably good and long lasting phototropic properties.

Briefly stated, this is accomplished (1) by treating or otherwise combining a suitable plastic with a photochromic metal dithizonate and (2) associating with the treated plastic another element or elements that improve and/or preserve the phototropic properties of the resulting unit.

The desirability of providing a laminated safety glass unit in which the plastic interlayer is photo- and/or thermotropic has been recognized (for example in U.S. Pat. No. 2,710,274 to G. W. Kuehl) as has the phototropic properties of some metal dithizonates when incorporated into certain types of plastics (British Pat. No. 1,010,234).

However, prior to the present invention no phototropic laminated safety glass commercially satisfactory for automotive glazing was available and, as discussed on page 2, lines 20 to 26 of British Pat. 1,010,234, metal dithizonates were considered to be unsuitable as phototropic materials when contained in the plasticized resin plastics commonly and most widely used in making commercial laminated safety glass.

It is accordingly a primary object of this invention to provide a phototropic plastic material which, in sheet form, is usable either alone or as a commercially practicable component of a stable, tightly bonded glass-plastic lamination.

Another object is the provision of a phototropic glazing unit that embodies such a plastic sheet and possesses notably improved color, faster responses and longer effective life than heretofore available in units of this character.

Further objects and advantages of the invention will become more apparent during the course of the following description when read in connection with the accompanying drawings.

In the drawings, wherein like numerals are employed to designate like parts throughout the same:

Figure 1:
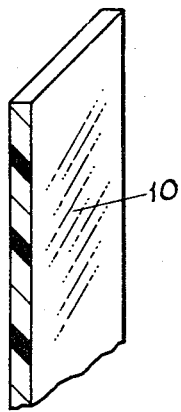
FIG. 1 is a sectional perspective view of one form of phototropic, plastic body or interlayer as contemplated by this invention.

In considering the present invention in detail it is important to note that the prior art, as exemplified by British Pat. 1,010,234, believed that while a number of different transparent resins could be used as carriers for the metal dithizonates of the patent the carrier employed must be free from nitro groups, hydroxyl groups, reactive amine groups and methacrylate monomers. This was because it was thought that such groups or monomers would act to inhibit color change (page 2, lines 20 to 26 of the patent).

However, the most important and the most potentially valuable of presently used and contemplated plastic interlayer materials for laminated safety glass all include one or another or more of these groups or monomers; and, in accordance with this invention, these interlayer materials can, when properly and sufficiently plasticized with a compatible plasticizer, and properly combined with metal dithizonates be rendered highly and efficiently phototropic.

By way of a preferred example only, and in no way to be interpreted as a limitation, polyvinyl butyral (PVB) which is used almost exclusively in the present day manufacture of laminated glass, when plasticized to an extent common in the laminated glass art with PEP (di(isodecyl)-4,5-epoxy tetrahydrophthalate), is rendered phototropic by incorporating into the plasticized resin, prior to forming it into a sheet, from .01% to 2.0% of diphenylthiocarbazone-mercuric-para-anisole (DZ-Hg-p-anisole).

In thicknesses common in automotive laminated safety glass (.015″) such a plastic layer is yellow in color and, when exposed to sunlight, darkens rapidly, assuming a uniform dark blue color in about 25 seconds. When shielded from the sun and at room temeprature it rapidly reverts to the original lighter and more transmissive yellow color, a noticeable change back occurring in less than 15 seconds and 100% reversion in around 5 minutes.

As indicated above, this invention is practiced by employing one of the metal dithizonates to render the plastic body phototropic. Most of the preliminary work on this was done with, and generally speaking it is preferred to employ, mercuric dithizonates having the following probable (the chemistry of Hg compounds are known to be peculiar) structural formula:

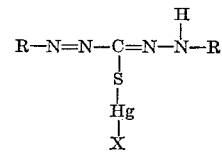

where R is an aryl group and X is a radical containing a group selected from carboxyl, ether, ester, amide, imide, nitrile, anhydride, amine, halide, nitrate, acrylate, methacrylate, halogenated aryl ethers, pyridyl, sulfonate, isocyanate, thiocyanate, cyanide, molybdate, tungstate and miscellaneous groups.

These materials may be used to render the plasticized plastic phototropic in a number of different ways, for example by applying them in solution or in suspension to the surface of the sheeted plastic or to a second plastic or glass sheet associated with it. Preferably however they are mixed or milled into the plastic before sheeting.

A representative and preferred procedure for producing a phototropic plastic sheet in accordance with the invention is described below and, because the manner of synthesizing the dithizonate has a definite effect on the properties of the finished product this will be considered the initial step in the procedure.

EXAMPLE

The dithizonate

Method I

The synthesis of diphenylthiocarbazone-mercury-paraanisole (abbreviated DZ-Hg-p-anisole), for example, involves the following two major chemical steps:

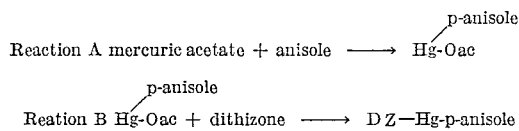

The product of Reaction B is the phototropic compound.

*Reaction A procedure.*—For the synthesis of the

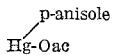

intermediate, 43.2 g. of Eastman EK No. 465 anisole and 32.0 g. of mercuric acetate, reagent grade, were dissolved in 300 ml. of glacial acetic acid in a one liter flask. The reaction was carried out with an air condenser and the flask heated in a bath maintained at 70° C. for 3½ hours. The hot mixture was poured into 1200 ml. of distilled water with vigorous stirring for 1 hour using a magnetic stirrer in a 2000 ml. flask. The white precipitate was vacuum filtered and washed with two 100 ml. portions of distilled water and pressed dry. The solids were air-dried overnight and then dispersed in 800 ml. of hexane and refluxed on a steam plate for 15 minutes. The mixture was stirred at room temperature for 1 hour, cooled in an ice bath, vacuum filtered and the solids washed with two 100 ml. portions of ice cold hexane. The precipitate was air-dried and then placed in a Soxhlet extraction for 12 hours. A 33 x 80 mm. thimble, 2000 ml. flask and 1000 ml. of hexane were used in the operation. The remaining solids were air-dried and then recrystallized from 300 ml. of methanol. The 8.7 grams of the para isomer obtained (24% yield) had a melting point of 181–2° C.

*Reaction B procedure.*—For the synthesis of the DZ-Hg-p-anisole compound, 5 grams of the

intermediate were dissolved in 250 ml. of chloroform. Six drops of acetic acid were added, and then 3.2 grams of dithizone were slowly added over a ½ hour period, the solution being stirred magnetically. The resulting solution, which was a bright yellow-orange in color, was evaporated on a hot plate till cooling caused slight crystallization. Hexane was added to precipitate the product, about 1200 ml. being required. The solution was cooled in ice and the bright orange product filtered off by suction. The product was redissolved in 100 ml. of $CHCl_3$, heated till all was in solution, and again precipitated with 1200 ml. of hexane, cooled in ice, filtered and dried at 80° C. over $P_2O_5$ under vacuum for 2 hours. The yield was 7.0 grams or 90% of the theoretical.

Method II

As an alternate procedure, Reaction A may be carried out by first refluxing a solution containing 15.0 grams of mercuric acetate, 20 ml. of methanol and 90 ml. of anisole for 3 hours. Then adding 20 ml. of methanol and 2.5 grams of glacial acetic acid and refluxing the solution for 64 hours. Next the solvents are evaporated under a vacuum to leave a white crystalline solid which is ground up to a powder and slurried in distilled water repeatedly to remove any water soluble impurities. When the white powder is then filtered off and dried it will be found to have a melting point of 165–175° C. and will react readily with dithizone to yield a strong phototropic compound.

Method III

The dithizonate may also be formed (Reaction B) by an alternate procedure. This consists in shaking an aqueous solution of a reacting heavy metal with an immiscible organic solution of dithizone. Chloroform and carbon tetrachloride are suitable solvents, the dithizone being generally soluble in organic solvents which impart a violet, orange, red or yellow color.

*The plastic sheet.*—A phototropic plastic sheet was produced by weighing out 0.0750 gram of DZ-Hg-p-anisole produced by Method I and dissolving it in 20 grams of di (iso decyl) 4,5-epoxy tetrahydrophthalate (PEP) plasticizer. After the dithizonate was in solution the plasticizer was mixed thoroughly with 50 grams of Butvar resin powder and this mixture was milled into a 12″ x 18″ sheet, .015″ thick, on the mill at 275° F. for about 8 minutes.

The following additional metal dithizonates, falling under the probable structural formula set forth above, as well as many others, were produced by one or more of the three methods outlined:

DZ-Hg-salicylate
DZ-Hg-citrate
DZ-Hg-succinimide
DZ-Hg-(1)
DZ-Hg-2,5-dichloro, 3,6-dihydroxy-p-benzoquinone
$DZ-Hg-MoO_4$
$DZ-Hg-WO_4$
DZ-Hg-napthalene sulfonate
DZ-Hg-anisole
DZ-Hg-gallate
DZ-Hg-cinnamate
DZ-Hg-anthranilate
DZ-Hg-salicylamide
DZ-Hg-mandelate
DZ-Hg-4-aminosalicylate
DZ-Hg-vanillate
DZ-Hg-pyridine
DZ-Hg-Mo-oxalate
DZ-Hg-W-gallate
DZ-Hg-PMA
DZ-Hg-O-anisole
DZ-Hg-dimethoxybenzene
DZ-Hg-phenyl ether
DZ-Hg-thiophene
DZ-Hg-aniline
secondary DZ-Hg-(11)Cl
DZ-Hg-CN
DZ-Hg-PVMA primary+secondary
DZ-Hg-SCN
DZ-Hg-ferrocene
DZ-Hg-P-methylanisole
DZ-Hg-P-anisole
$DZ-Hg-P-anisole+H_2WO_4$
$DZ-Hg-P-anisole+H_2MoO_4$
DZ-Hg-p-chloroanisole
DZ-Hg-p-fluoroanisole
DZ-Hg-methylanthranilate DZ-Hg-pyrrolidone
DZ-Hg-n-butylcrotonate
DZ-Hg-itaconate
DZ-Hg-methacrylate
DZ-Hg-butyl acrylate
DZ-Hg-O-fluorophenetole
DZ-Hg-anisonitrile
DZ-Hg-benzil
DZ-Hg-p-anisidine
DZ-Hg-volan
DZ-Hg-p-nitroanisole
DZ-Hg-anisyl alcohol
DZ-Hg-anisaldehyde
DZ-Hg-methacrylic acid
DZ-Hg-2.5 dimethoxyaniline
DZ-Hg-vinylcyclohexane dioxide
DZ-Hg-indole
DZ-Hg-EDTA
DZ-Hg-EDTA-Fe
DZ-Hg-1.4 dimethoxy-2-nitrobenzene
DZ-Hg-anethole
DZ-Hg-2 ethoxynaphthalene
DZ-Hg-carbazole
DZ-Hg-3.3 dimethoxybenzidine
Hg (HDZ)$_2$
DZ-Hg-2.5 dimethoxytolene
DZ-Hg-p-methoxy-phenyl isocyanate Also all of these, as well as the diphenylthiocarbazone mercuric anisole, were incorporated into interlayers of laminated safety glass units as described and all of the resulting units exhibited strong color change when tested for phototropic properties.

As has been indicated above, this invention is especially concerned with phototropic plastic bodies of the type in which the plastic carrier for the metal dithizonate contains nitro groups, hydroxyl groups, reactive amine groups or methacrylate monomers because the plastic materials that are most widely used or are potentially most important for use in laminated safety glass interlayers all contain one or more of these groups or monomers. Thus, polyvinyl butyral, which was employed in the examples above and is presently used almost exclusively as the interlayer material in commercially available laminated safety glass, contains many OH groups; and other promising interlayer materials presently under consideration by the assignee company for possible future use also contain at least one such group or monomer.

Nevertheless certain phases of the invention, having to do with increased efficiency, longer life and improved appearance of the unit, are equally important for use in connection with other types of plastic sheets that have been rendered phototropic by the addition of metal dithizonates including those carriers suggested in the above mentioned British patent.

For example, one of the features of this invention has to do with the way in which the phototropic resin is plasticized and this involves both the degree of plasticization and the type of plasticizer used. Thus, the chemical reactions within the plastic body both during the darkening and the fading color change require sufficient mobility in the medium for the mechanism to take place. In other words, the efficiency of the photochromic action in a plastic body is, to a notable extent, a function of its softness or degree of plasticization.

Generally speaking, from 25 to 45 parts by weight of plasticizer gives good phototropic results in accordance with this invention and, when the plastic body is used as an interlayer for laminated safety glass it is preferred that plasticization be well within these limits to also obtain the best physical results. On the other hand, if the plastic body is to be used alone and/or in greater thicknesses, something less than 25 parts plasticizer may be used; or, for special uses more than 45 parts can be used. However, it must be appreciated that as the amount of plasticizer is increased beyond the upper limit the plastic sheet becomes progressively and, ordinarily, objectionably softer; and as the plasticizer is decreased below the lower limit the phototropic action will be slowed down appreciably, especially in the fading or reversion cycle of the color change.

Similarly, the type of plasticizer employed is important and, while in making laminated safety glass units all of the commonly used plasticizers will produce workable phototropic units, more efficient and stable units can be had by a proper selection of plasticizers. For example, in the commercial manufacture of laminated safety glass polyvinyl butyral interlayers are generally and preferably plasticized with 3GH (di-2-ethyl butyrate triethylene glycol), and may be so plasticized in making a phototropic unit of this character. However, the life of such a laminated phototropic unit can be extended by simply employing a different plasticizer. For example a laminated unit, made up of two ⅛" sheets of iron containing, heat absorbing glass with an interlayer of .015" polyvinyl butyral plasticized with 3GH and rendered phototropic by milling a metal dithizonate into the interlayer, was tested along with a unit that was identical, except that the resin was plasticized with di(isodecyl) 4,5-epoxy tetrahydrophthalate (PEP), by exposing them 45° to the south in direct sunlight. The unit with the PEP plasticized interlayer had an effective life more than 10 times as long as the 3GH plasticized one.

Other plasticizers that have been employed in the same way and which when tested have been found to give the units effective lives varying in lengths from that of 3GH to that of PEP are:

di-2-ethylbutyrate triethylene glycol
dibutyl sebacate
dibutylcellosolve adipate
epoxy tallate
tributyl citrate
tris-betachloroethyl phosphate
di-2-ethylhexyl adipate
Benzoflex 2–45
soy derivative
dibutyl isosebacate
dioctyl phthalate
diethylene glycol dipelargonate
di-isobutyl adipate
dicapryl sebacate
dibenzyl sebacate
triethylene glycol dipelargonate
dibutyl terephthalate
tributyl phosphate
Cabflex HS–10
tricresyl phosphate
iso-octyldecyladipate
dicapryl adipate
di-2-ethylhexyltrimethyl adipate
acetyltributyl citrate
iso-octyldecylphthalate
di-isooctyl adipate
methylcyclohexyl phthalate
di-isooctyl sebacate
dihexyl sebacate
dicapryl phthalate
di-2-ethylhexoate triethylene glycol
dibutoxyethyl sebacate Another feature of the invention that has a pronounced effect on extending the effective life of the phototropic body is the provision of a decomposition retarder in or as part of the body. Such a retarder is preferably in the form of a screen designed to cut down materially on the passage to the phototropic material of light rays of a wavelength that have a deleterious action on it while, at the same time, not appreciably interfering with the passage of light in the exciting or activating wavelengths.

One of the advantages of the laminated safety glass or quasi-safety glass phases of this invention is that they provide a built in decomposition retarder in the sheet or sheets of glass that are laminated to the plastic carrier for the metal dithizonate. Thus, all commercial sheet and plate glasses are natural screens since all of them act to cut out the passage of at least some of the light rays at the ultra violet end of the spectrum while being high transmitters of visible light; and their effectiveness as decomposition retarders for the metal dithizonates can be enhanced by employing so-called heat absorbing or high iron containing glasses of the type sold by the assignee company under the trade name "E-Z-Eye" glass.

Other types of decomposition retarders contemplated by this invention are ultraviolet light filters of various kinds, comprising both the absorbing and reflecting types, and specifically including transparent, reflective films and special color dyes.

Referring now more particularly to the drawings, there has been illustrated in FIG. 1 the simplest form of phototropic body contemplated by this invention and which is a sheet or layer of plastic 10 carrying, or rendered phototropic by, a metal dithizonate which may be milled into the plastic body or applied as a coating onto one of its surfaces. Generally speaking, it is preferred that the metal dithizonate be milled into the plastic body which is of a thickness and plasticity dependent upon the use to which it is to be put.

Thus, when it is to be used as an interlayer for laminated safety glass the sheet 10 will usually be approximately .015" in thickness and plasticized with around 43 parts plasticizer to give a highly flexible consistency at room temperature. On the other hand, if the sheet 10 is to be used by itself or as an outboard sheet in a laminated unit it may be considerably thicker and more lightly plasticized to provide a self supporting, or even rigid sheet at room temperature.

Figure 2:
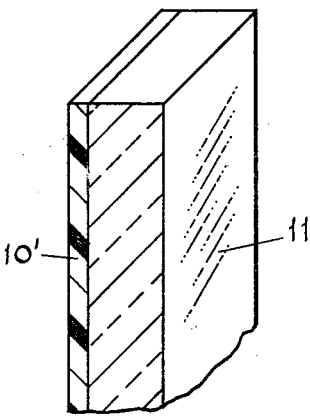
FIGS. 2 to 7 are similar views of various forms of multilayer phototropic units embodying the invention.

The plastic sheet 10 may have a decomposition retarder incorporated into, added onto, or associated with it in any of the ways already suggested and which will be more fully hereinafter described. For example, the simplest form of lamination contemplated by the invention is illustrated in FIG. 2 as being made up of one sheet of phototropic plastic 10' and a single sheet of glass 11 bonded to one surface thereof. When this unit is positioned with the glass toward the light source, the glass will serve as a decomposition retarder in the manner already explained.

Figure 3:
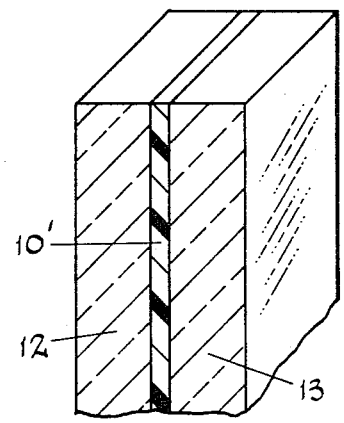
Figure 4:
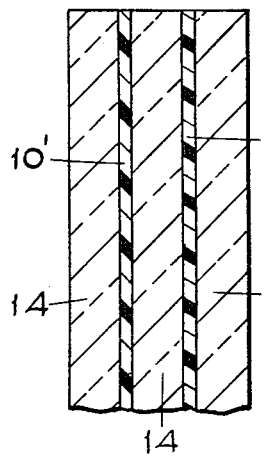
Figure 5:
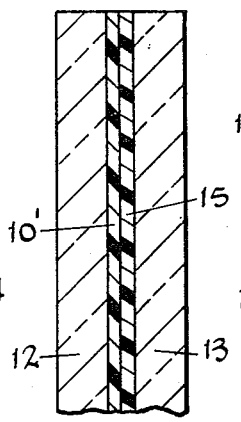
Figure 6:
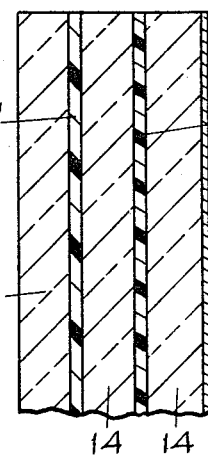
Figure 7:
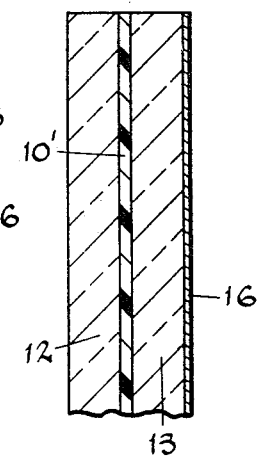

The same thing is true with the most commonly used form of laminated safety glass, shown in FIG. 3, where the phototropic interlayer 10' is laminated between two sheets of glass 12 and 13. FIGS. 4 to 7 illustrate various other combinations and arrangements of glass-plastic laminations, all of which utilize glass as a decomposition retarder, but which may also include other and more effective means for extending the effective life of the phototropic plastic layer they contain.

To test the effect of a representative number of specifically different arrangements of laminations, and specifically different decomposition retarders, a series of 10 different laminated safety glass samples were made up. In each of these the plastic interlayer or interlayers were of polyvinyl butyral, plasticized with di(iso-decyl)4,5-epoxy tetrahydrophthalate and rendered phototropic by milling into it diphenylthiocarbazone-mercury-para-anisole in the manner described in the example. The interlayers were in the usual .015" thicknesses, the glass sheets were approximately ⅛" thick and the laminating cycle used was 250 p.s.i. at 250° F. for 20 minutes.

In this way, a control was provided against which the effect of specific decomposition retarders (filters and films) could be measured.

The configuration of each of the ten laminates is set forth in the column so headed in Table A below, with the laminates being laid up from left to right and exposed from the right:

TABLE A

| Laminate No. | Configuration | Initial Transmittance | | | Transmittance After Hours Exposure in Weatherometer, Light | | | | | | | | Final Transmittance | | | Loss in Transmittance After 1000 Hrs. | |
|---|---|---|---|---|---|---|---|---|---|---|---|---|---|---|---|---|---|
| | | Light | Dark | Range | 104 | 245 | 386 | 466 | 578 | 707 | 843 | 1000 | Light | Dark | Range | Light | Dark |
| 1 | RP-(I)–RP-Filter A-EZ | 55.3 | 14.8 | 40.5 | 57.8 | 58.5 | 59.8 | 61.1 | 62.1 | 59.1 | 61.2 | 62.2 | 62.2 | 33.3 | 28.9 | 6.9 | 18.5 |
| 2 | RP-(II)–RP-Filter A-EZ | 55.8 | 15.9 | 39.9 | 58.7 | 60.0 | 60.9 | 62.1 | 62.9 | 60.8 | 62.7 | 63.1 | 63.1 | 32.8 | 30.3 | 7.2 | 16.9 |
| 3 | RP-(I)–Filter B-EZ | 57.8 | 16.4 | 41.4 | 60.0 | 59.0 | 62.7 | 63.0 | 64.0 | 60.9 | 63.6 | 64.8 | 64.8 | 35.8 | 29.0 | 7.0 | 19.4 |
| 4 | RP-(II)–Filter B-EZ | 57.9 | 16.1 | 41.8 | 61.2 | 61.5 | 64.7 | 65.0 | 65.1 | 63.9 | 65.2 | 66.8 | 66.8 | 42.1 | 24.7 | 8.9 | 26.0 |
| 5 | RP-(I)–Filter B-RP | 65.7 | 18.5 | 46.5 | 67.2 | 66.2 | 68.7 | 70.8 | 71.1 | 68.2 | 71.2 | 71.9 | 71.9 | 39.1 | 32.8 | 6.3 | 20.6 |
| 6 | RP-(II)–Filter B-RP | 65.7 | 22.2 | 43.5 | 63.9 | 67.8 | 70.2 | 70.8 | 71.8 | 68.1 | 70.9 | 72.0 | 72.0 | 38.7 | 33.3 | 6.3 | 16.5 |
| 7 | RP-(II)–Filter B-RP | 51.8 | 13.8 | 38.0 | 53.9 | 55.2 | 55.2 | 56.1 | 57.8 | 57.8 | 58.2 | 58.9 | 58.9 | 41.0 | 17.9 | 7.0 | 20.6 |
| 8 | EZ-(I)–EZ | 52.2 | 17.2 | 34.8 | 56.2 | 58.0 | 57.8 | 58.2 | 59.1 | 59.2 | 60.8 | 61.9 | 61.9 | 49.0 | 12.9 | 7.9 | 27.2 |
| 9 | EZ-(II)–EZ | 32.9 | 11.0 | 21.9 | 33.2 | 34.4 | 34.9 | 35.1 | 35.2 | 33.2 | 35.1 | 35.0 | 35.0 | 16.9 | 18.1 | 2.1 | 31.8 |
| 10 | RP-(II)–RP-Film | 31.0 | 10.9 | 20.1 | 33.0 | 33.0 | 34.0 | 34.6 | 34.9 | 34.9 | 35.0 | 35.2 | 35.2 | 23.2 | 12.0 | 4.2 | 12.3 |

In the "Configuration" column in the above table, "RP" denotes a sheet of regular plate glass and "EZ" a sheet of high iron glass; the Roman numerals denote a phototropic plastic interlayer made by the method numbered correspondingly in the example above; "Filter A" and "Filter B" denote particular ultraviolet light filters; and "Film" denotes a transparent, reflecting film. Laminates designated as 1 and 2 (illustrated in FIG. 4 of the drawings) and laminate designated 9 (illustrated in FIG. 6) were made up with three glass plies 14. All of the others (illustrated in FIGS. 3, 5 and 7) were made with two glass plies 12 and 13.

In laminates 1 and 2 (illustrated in FIG. 4), 3 to 6 (illustrated in FIG. 5) and 9 (illustrated in FIG. 6), UV filters 15 of two different compositions, depending upon their position in the laminates, were used. "Uvinul D–50," purchased from General Aniline and Film Corporation, was used as the filter material in both and "Filter A" was made by milling 50 grams of Butvar, 20 grams 3GH, 0.2100 gram of Uvinul D–50 and 0.0500 gram of para-octyl phenol into a .015" sheet. "Filter B" was identical except that 20 grams of PEP was used as the plasticizer. Filter B was used where the filter sheet was placed in contact with the phototropic interlayer (laminates 3 to 6, illustrated in FIG. 5) because, as explained above, the phototropic material in contact with PEP has a longer effective life.

The films 16 of laminates 9 and 10 (illustrated in FIGS. 6 and 7 respectively) were blue films of Sn-Sb composition sprayed on the glass and had a transmittance of 45%.

The figures in Table A present the exposure data in percent of light transmittance as the laminates were examined at various intervals up to 1000 hours in a single arc weatherometer. The readings during the exposure period were all taken in the light or unexcited state but initial and final transmittances are in both the light and dark condition. Dark readings were taken as quickly as possible but, since fading starts immediately, these readings are not the exact minimum. The range is the difference between the light and dark readings. Similar data are presented on the laminates after the 1000 hours exposure. The last two columns show the loss in transmittance by fading during the exposure in the light and dark condition. After 578 hours, the exposure was discontinued for a period of two months and then resumed.

The results of the exposure, as observed by comparing the loss in transmittance for the various configurations, show, inter alia, that:

(a) The combination of film and filter is very effective in retarding fading, with the loss over 1000 hours being 2.1% and 5.9% in the light and dark forms, respectively.

(b) The reflecting film gives more protection than does the filter, each by themselves (compare laminates 6 and 10).

(c) The use of three glass plates plies with separated filters appears to have no great advantage over two plies with the filter in contact with the phototropic sheet (compare laminates 1 and 2 with 3 through 6). However, the effect of the filter is very positive as shown by comparing laminates 9 and 10.

(d) Each laminate containing a filter in any location recovered significantly during the two month rest at 578 hours. None of the others did.

It was also observed that the orange color in the unexcited yellow plastic is unstable and fades out quickly in the sun or weatherometer leaving a lighter yellow but with no significant effect on the density of the excited blue color; the use of a blue film 16 definitely toned down the yellow color; and after the 1000 hours exposure, all ten laminates still colored in bright sunlight and faded in the dark at the normal rate.

Following the exposure tests recorded in Table A, additional tests designed to show the effectiveness of coloring dyes as decomposition retarders were made. The results of these are shown by transmission curves in FIGS. 8 to 10 of the drawings and are based on the knowledge that light rays in the area of the spectrum between about .3 and .45 micron are the ones that cause the most rapid decomposition of and resulting loss of effectiveness in the phototropic metal dithizonates.

Figure 8:
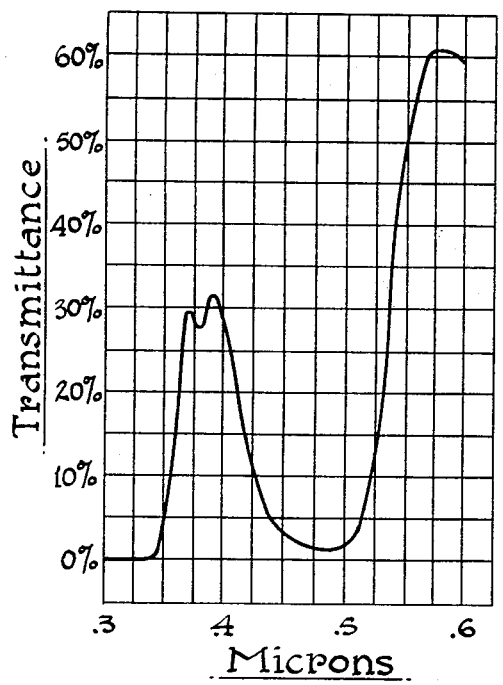
FIGS. 8 to 10 are transmission curves for specific forms of phototropic units.

Thus, as seen in FIG. 8, a sample made as shown in FIG. 3 and with the interlayer 10' made up of 50 grams of polyvinyl butyral plasticized with 20 grams of PEP and rendered phototropic by having .0750 gram of DZ-Hg-p-anisole milled thereinto and with no decomposition retarder except the glass in the lamination shows a definite reduction of transmittance in the critical area with a peak transmittance of around 30% in the .37 to .40 micron area.

Figure 9:
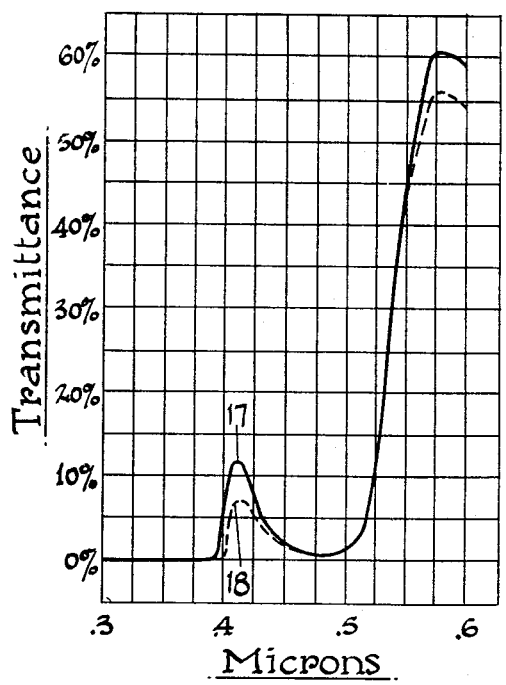

However, when an interlayer prepared in the same way, but with .2800 gram (0.4%) of the ultra violet filter material added, is used, the transmisison in the critical area of the spectrum is sharply reduced as shown by the full line 17 in FIG. 9. Additional improvement, with relatively slight reduction in the visible, is obtained by adding .7000 gram (1.0%) of the filter material as illustrated by the broken line 18 in the same figure; but practically no further improvement results when the amount of filter material is increased beyond that point. In fact, 1.4000 grams (2.0%) gives a curve substantially the same as that shown at 18.

Figure 10:
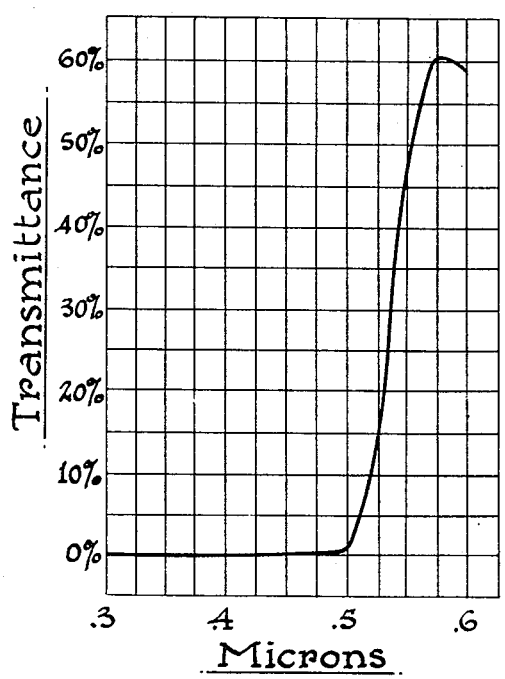

On the other hand, when much smaller amounts of a yellow dye are added, instead of the filter material, to the interlayer a surprising reduction in transmission in the critical area is noted. Thus, FIG. 10 illustrates the result of adding only .0500 gram (.07%) of a yellow dye (sold by National Aniline Co. as Plasto Yellow MGS) to the interlayer. The addition of an increased amount of the dye (.1000 gram or .14%) gives an even flatter curve between .3 and .5 micron and, when .3000 gram (.43%) is used, the curve appears to be completely flat between those points and with practically no loss in visible transmission.

In view of the remarkable performance of the dye and the relative facility with which it can be incorporated into any type of unit from a single layer of phototropic plastic to the most involved glass-plastic type lamination, it is generally preferred as the decomposition retarder.

In selecting the dye it is only necessary that it be compatible with the materials with which it is to come in contact and that it be of a color generally in the yellow-orange region, with the most efficient being those of a yellow, or yellow toward orange color.

Where, as is the case with the mercuric dithizonates, the phototropic body is of a yellowish color, the addition of a yellow to orange dye does not materially alter the appearanace of the unit and, in any event, some modification of the color to improve or enhance appearance or to tone the unit into its environment can be had, as indicated above, by the use of transparent, reflective films 16 of materials that will provide the desired complementary or modifying color.

I claim:

1. In a phototropic unit the combination, with a body of plastic, of a metal dithizonate rendering said body phototropic and having the following structural formula:

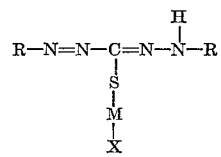

where M is an element selected from the group consisting of bismuth, cadmium, cobalt, copper, gold, indium, iron, lead, manganese, mercury, nickel, palladium, platinum, polonium, silver, tellurium, thallium, tin and zinc; where R is an aryl group; and X is a radical containing a group selected from those consisting of carboxyl, ether, ester, amide, imide, nitrile, anhydride, amine, nitrate, acrylate, methacrylate, halogenated aryl ethers, pyridyl, sulfonate, isocyanate, thiocyanate, cyanide, molybdate, and tungstate.

2. A unit as defined in claim 1 in which said plastic is a sheet of synthetic resin containing at least one of the following:
   an hydroxyl group
   a reactive amino group
   a nitro group
   a methacrylate monomer
and is plasticized with from 25 to 45 parts by weight of a compatible plasticizer.

3. A unit as defined in claim 2 in which said synthetic resin plastic is a sheet of polyvinyl butyral.

4. A unit as defined in claim 3 in which said polyvinyl butyral is plasticized with di(iso-decyl) 4,5-epoxy tetrahydrophthalate.

5. A unit as defined in claim 1 in which said dithizonate is diphenylthiocarbazone-mercury-para-anisole.

6. A unit as defined in claim 1 in which said plastic body is a sheet of polyvinyl butyral plasticized with di-(iso-decyl) 4,5-epoxy tetrahydrophthalate, and said dithizonate is a mercuric dithizonate.

7. A unit as defined in claim 1 in which said plastic body is a sheet of polyvinyl butyral plasticized with di-(iso-decyl) 4,5-epoxy tetrahydrophthalate, and said dithizonate is diphenylthiocarbazone-mercury-para-anisole.

8. A unit as defined in claim 1 and including a retarder for said dithizonate which comprises at least one member of the group consisting of a sheet of glass, an ultra violet filter, a transparent light reflecting film, and a yellow dye.

9. A unit as defined in claim 8 in which said body of plastic is a sheet of polyvinyl butyral plasticized with di-(iso-decyl) 4,5-epoxy tetrahydrophthalate, said dithizonate is diphenylthiocarbazone-mercury-para-anisole, and said retarder is a yellow dye.

10. A unit as defined in claim 8 in which said plastic body is in sheet form and said retarder is at least one sheet of glass heat and pressure laminated to said plastic.

11. A unit as defined in claim 10 in which said glass is heat absorbing glass.

12. A unit as defined in claim 8 in which said plastic body is in sheet form and said retarder includes spaced sheets of glass, and an ultra violet filter heat and pressure laminated with said plastic between said glass.

13. A unit as defined in claim 8 in which said plastic body is a sheet and said retarder comprises a sheet of glass heat and pressure laminated to said plastic, and a transparent heat rejecting film associated with said lamination.

14. A unit as defined in claim 8 in which said plastic body is a sheet plasticized with a compatible plasticizer, said retarder comprises a yellow dye, and said dithizonate and said dye are mixed with the plastic in said plasticized sheet.

15. A unit as defined in claim 8 in which said body of plastic is a sheet polyvinyl butyral plasticized with di-(iso-decyl) 4,5-epoxy tetrahydrophthalate, said dithizonate is diphenylthiocarbazone-mercury-para-anisole, and said retarder comprises sheets of glass heat and pressure laminated to opposite surfaces of said plasticized sheet of plastic.

16. A unit as defined in claim 15 in which at least one of said sheets of glass is a sheet of heat absorbing glass.

17. In combination, a plastic body, and a mercuric dithizonate wherein DZ is diphenylthiocarbazone and which is selected from the group consisting of:
   DZ-Hg-citrate
   DZ-Hg-succinimide
   DZ-Hg-MoO$_4$
   DZ-Hg-WO$_4$
   DZ-Hg-cinnamate
   DZ-Hg-pyridine
   DZ-Hg-Mo-oxalate
   DZ-Hg-phosphomolybdic acid
   DZ-Hg-thiophene
   DZ-Hg-CN
   DZ-Hg-SCN
   DZ-Hg-ferrocene
   DZ-Hg-p-anisole
   DZ-Hg-p-anisole+H$_2$WO$_4$
   DZ-Hg-p-anisole+H$_2$MoO$_4$
   DZ-Hg-pyrrolidone
   DZ-Hg-n-butylcrotonate
   DZ-Hg-itaconate
   DZ-Hg-methacrylate
   DZ-Hg-butylacrylate
   DZ-Hg-volan
   DZ-Hg-methacrylic acid
   DZ-Hg-vinylcyclohexane dioxide
   DZ-Hg-3.3 dimethoxybenzidine
rendering said body phototropic.

References Cited

UNITED STATES PATENTS

| | | | |
|---|---|---|---|
| 2,693,492 | 11/1954 | Hoch | 156—106 |
| 2,710,274 | 6/1955 | Kuehl | 161—199 |
| 2,976,197 | 3/1961 | Cox | 156—106 |
| 3,069,301 | 12/1962 | Buckley et al. | 161—199 |
| 3,192,101 | 6/1965 | Koenig | 161—199 |
| 3,218,261 | 11/1965 | Gall | 161—199 |
| 3,244,582 | 4/1966 | Kuhl | 161—199 |
| 3,351,518 | 11/1967 | Ryan | 161—199 |
| 3,361,706 | 1/1968 | Meriwether et al. | 260—39 |

FOREIGN PATENTS 1,010,234  11/1965  Great Britain.

OTHER REFERENCES

Wagner et al. (Germany), Auslegeschrift 1,165,411, Mar. 12, 1964.

Meriwether et al.: Jour. Am. Chem. Soc., vol. 87, No. 20, Oct. 20, 1965, pp. 4441–4454.

ROBERT F. BURNETT, Primary Examiner

W. J. VAN BALEN, Assistant Examiner

U.S. Cl. X.R.

161—410; 252—300; 260—41; 350—160